(12) United States Patent
Birau et al.

(10) Patent No.: US 11,939,478 B2
(45) Date of Patent: Mar. 26, 2024

(54) METALLIC INKS COMPOSITION FOR DIGITAL OFFSET LITHOGRAPHIC PRINTING

(71) Applicant: XEROX CORPORATION, Norwalk, CT (US)

(72) Inventors: Mihaela Maria Birau, Hamilton (CA); C. Geoffrey Allen, Waterdown (CA); Aurelian Valeriu Magdalinis, Newmarket (CA)

(73) Assignee: XEROX CORPORATION, Norwalk, CT (US)

( * ) Notice: Subject to any disclaimer, the term of this patent is extended or adjusted under 35 U.S.C. 154(b) by 877 days.

(21) Appl. No.: 16/814,548

(22) Filed: Mar. 10, 2020

(65) Prior Publication Data

US 2021/0284851 A1 Sep. 16, 2021

(51) Int. Cl.
*C09D 11/00* (2014.01)
*B41C 1/10* (2006.01)
(Continued)

(52) U.S. Cl.
CPC .............. *C09D 11/037* (2013.01); *B41C 1/10* (2013.01); *B41M 1/06* (2013.01); *C09C 1/0015* (2013.01);
(Continued)

(58) Field of Classification Search
CPC ..... C09D 11/00; C09D 11/037; C09D 11/101; B41C 1/10; B41M 1/06; C09C 1/0015;
(Continued)

(56) References Cited

U.S. PATENT DOCUMENTS

| 3,945,957 A | 3/1976 | Noshiro et al. |
| 4,174,244 A | 11/1979 | Thomas et al. |
| (Continued) | | |

FOREIGN PATENT DOCUMENTS

| EP | 1428673 A1 | 6/2004 |
| EP | 1235863 B1 | 1/2005 |
| (Continued) | | |

OTHER PUBLICATIONS

Extended European Search Report dated Aug. 26, 2021 in corresponding European Application No. 21159764.6, 6 pages.
(Continued)

*Primary Examiner* — James E McDonough
(74) *Attorney, Agent, or Firm* — MH2 Technology Law Group LLP

(57) ABSTRACT

The present disclosure is directed to a metallic ink composition for use in digital offset printing, comprising: metallic effect pigment particles, wherein an average equivalent sphere diameter of at least about 90% of the metallic effect pigment particles ranges from greater than 1 micrometer (μm) to 150 μm; at least one dispersant; at least one curable oligomer; and a photo initiator, wherein the metallic ink composition has a viscosity ranging from 150,000 to 1,000,000 millipascal seconds (mPa·s) at 0.1 rad/s at 25° C. Also provided is a method of digital offset printing using the metallic ink composition of the present disclosure.

20 Claims, 1 Drawing Sheet

(51) Int. Cl.
  *B41M 1/06* (2006.01)
  *C09C 1/00* (2006.01)
  *C09C 1/24* (2006.01)
  *C09C 1/30* (2006.01)
  *C09C 1/36* (2006.01)
  *C09D 11/037* (2014.01)
  *C09D 11/101* (2014.01)

(52) U.S. Cl.
  CPC .......... *C09C 1/0087* (2013.01); *C09C 1/24* (2013.01); *C09C 1/30* (2013.01); *C09C 1/3607* (2013.01); *C09D 11/101* (2013.01); *C01P 2004/60* (2013.01); *C09C 2200/102* (2013.01); *C09C 2200/505* (2013.01)

(58) Field of Classification Search
  CPC ........... C09C 1/0087; C09C 1/24; C09C 1/30; C09C 1/3607; C09C 2200/102; C09C 2200/505; C01P 2004/60
  USPC .................................. 106/31.01, 31.13, 31.6
  See application file for complete search history.

(56) References Cited

U.S. PATENT DOCUMENTS

| | | |
|---|---|---|
| 4,304,601 A | 12/1981 | Sharp |
| 4,403,550 A | 9/1983 | Sharp |
| 4,445,432 A | 5/1984 | Ford, Jr. et al. |
| 4,531,135 A | 7/1985 | Toshima |
| 4,711,818 A | 12/1987 | Henry |
| 4,806,391 A | 2/1989 | Shorin |
| 4,911,999 A | 3/1990 | Legere |
| 4,927,180 A | 5/1990 | Trundle et al. |
| 5,085,698 A | 2/1992 | Ma et al. |
| 5,292,855 A | 3/1994 | Krutak et al. |
| 5,437,912 A | 8/1995 | Chou et al. |
| 5,502,476 A | 3/1996 | Neal et al. |
| 5,665,151 A | 9/1997 | Escano et al. |
| 5,739,189 A | 4/1998 | Lorenz et al. |
| 5,814,580 A | 9/1998 | Onishi et al. |
| 5,834,118 A | 11/1998 | Rånby et al. |
| 5,886,067 A | 3/1999 | Li et al. |
| 5,969,003 A | 10/1999 | Foucher et al. |
| 5,977,202 A | 11/1999 | Chawla et al. |
| 5,977,209 A | 11/1999 | Breton et al. |
| 6,008,296 A | 12/1999 | Yang et al. |
| 6,114,489 A | 9/2000 | Vicari et al. |
| 6,140,392 A | 10/2000 | Kingman et al. |
| 6,239,189 B1 | 5/2001 | Narayan et al. |
| 6,289,809 B1 | 9/2001 | Sonobe |
| 6,329,446 B1 | 12/2001 | Sacripante et al. |
| 6,348,561 B1 | 2/2002 | Mychajlowskij et al. |
| 6,374,734 B1 | 4/2002 | Gaffney et al. |
| 6,664,015 B1 | 12/2003 | Sacripante et al. |
| 6,688,226 B2 | 2/2004 | Rossini et al. |
| 6,896,937 B2 | 5/2005 | Woudenberg |
| 7,022,752 B2 | 4/2006 | Hayashi et al. |
| 7,151,153 B2 | 12/2006 | Bruchmann et al. |
| 7,202,006 B2 | 4/2007 | Chopra et al. |
| 7,208,258 B2 | 4/2007 | Gervasi et al. |
| 7,322,688 B2 | 1/2008 | Woudenberg |
| 7,538,070 B2 | 5/2009 | Iftime et al. |
| 7,556,844 B2 | 7/2009 | Iftime et al. |
| 7,674,326 B2 | 3/2010 | Iftime et al. |
| 7,708,396 B2 | 5/2010 | Iftime et al. |
| 7,718,325 B2 | 5/2010 | Norsten et al. |
| 7,723,398 B2 | 5/2010 | Ilg et al. |
| 7,909,924 B2 | 3/2011 | Krishnan et al. |
| 7,964,271 B2 | 6/2011 | Norsten et al. |
| 8,001,889 B2 | 8/2011 | Gaugenrieder et al. |
| 8,124,791 B2 | 2/2012 | Shinjo et al. |
| 8,158,032 B2 | 4/2012 | Liu et al. |
| 8,158,693 B2 | 4/2012 | Breton et al. |
| 8,222,313 B2 | 7/2012 | Iftime et al. |
| 8,771,787 B2 | 7/2014 | Breton et al. |
| 8,877,332 B2 | 11/2014 | Trummer et al. |
| 8,895,400 B2 | 11/2014 | Seo et al. |
| 8,934,823 B1 | 1/2015 | Pickering et al. |
| 9,011,594 B1 | 4/2015 | Kanungo et al. |
| 9,193,209 B2 | 11/2015 | Dooley et al. |
| 9,283,795 B1 | 3/2016 | Kanungo et al. |
| 9,359,512 B2 | 6/2016 | Moorlag et al. |
| 9,387,661 B2 | 7/2016 | Zirilli |
| 9,422,436 B2 | 8/2016 | Birau et al. |
| 9,644,105 B2 | 5/2017 | Breton et al. |
| 9,724,909 B2 | 8/2017 | Moorlag et al. |
| 9,744,757 B1 | 8/2017 | Stowe et al. |
| 9,890,291 B2 | 2/2018 | Allen et al. |
| 9,950,549 B2 | 4/2018 | Kanungo et al. |
| 10,072,177 B2 | 9/2018 | Burrows et al. |
| 10,748,597 B1 | 8/2020 | Caporale et al. |
| 10,813,225 B2 | 10/2020 | Daniels |
| 10,878,875 B2 | 12/2020 | Caporale et al. |
| 10,995,232 B2 | 5/2021 | Cao et al. |
| 11,124,663 B2 | 9/2021 | Claridge et al. |
| 11,230,135 B2 | 1/2022 | Sambhy et al. |
| 11,261,341 B2 | 3/2022 | Vella et al. |
| 11,298,964 B2 | 4/2022 | Sambhy et al. |
| 11,363,721 B2 | 6/2022 | Daniels |
| 2002/0040073 A1 | 4/2002 | Stone et al. |
| 2002/0107303 A1 | 8/2002 | Miyabashi et al. |
| 2003/0003323 A1 | 1/2003 | Murakami et al. |
| 2003/0018100 A1 | 1/2003 | Foucher et al. |
| 2003/0021961 A1 | 1/2003 | Ylitalo et al. |
| 2003/0044691 A1 | 3/2003 | Setthachayanon et al. |
| 2003/0052261 A1 | 3/2003 | Chapman et al. |
| 2003/0073762 A1 | 4/2003 | Jung et al. |
| 2003/0149130 A1 | 8/2003 | Kondo |
| 2003/0187098 A1 | 10/2003 | Chen et al. |
| 2003/0196747 A1 | 10/2003 | Kwasny et al. |
| 2003/0233953 A1 | 12/2003 | Pan et al. |
| 2004/0009363 A1 | 1/2004 | Shouldice et al. |
| 2004/0062071 A1 | 4/2004 | Rodriguez et al. |
| 2004/0063809 A1 | 4/2004 | Fu et al. |
| 2004/0132862 A1 | 7/2004 | Woudenberg |
| 2004/0233465 A1 | 11/2004 | Coyle et al. |
| 2005/0166783 A1 | 8/2005 | Ylitalo et al. |
| 2006/0054040 A1 | 3/2006 | Daems et al. |
| 2006/0110611 A1 | 5/2006 | Badesha et al. |
| 2006/0119680 A1 | 6/2006 | Kato et al. |
| 2007/0022901 A1* | 2/2007 | Kurze ................. C09D 11/101 523/160 |
| 2007/0073762 A1 | 3/2007 | Adamson et al. |
| 2007/0166479 A1 | 7/2007 | Drake et al. |
| 2007/0257976 A1 | 11/2007 | Takabayashi |
| 2007/0259986 A1 | 11/2007 | Elwakil et al. |
| 2008/0090929 A1 | 4/2008 | Wilson et al. |
| 2008/0139743 A1 | 6/2008 | Krishnan et al. |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1 | 2/2009 | Odell et al. |
| 2009/0104373 A1 | 4/2009 | Vanbesien et al. |
| 2009/0110843 A1 | 4/2009 | Halahmi et al. |
| 2009/0129190 A1 | 5/2009 | Ikkink et al. |
| 2009/0135239 A1 | 5/2009 | Chretien et al. |
| 2009/0250522 A1 | 10/2009 | Williams et al. |
| 2009/0280302 A1 | 11/2009 | Fukumoto et al. |
| 2010/0016513 A1 | 1/2010 | Hartmann et al. |
| 2010/0020123 A1 | 1/2010 | Hirato |
| 2010/0067056 A1 | 3/2010 | Rich et al. |
| 2010/0086701 A1 | 4/2010 | Iftime et al. |
| 2010/0214373 A1 | 8/2010 | Carr et al. |
| 2010/0239777 A1 | 9/2010 | Nakajima et al. |
| 2010/0297045 A1 | 11/2010 | Kaupp et al. |
| 2010/0304040 A1 | 12/2010 | Chretien et al. |
| 2011/0045199 A1 | 2/2011 | Cong |
| 2011/0141187 A1 | 6/2011 | Takabayashi |
| 2011/0188023 A1 | 8/2011 | Rondon et al. |
| 2011/0196058 A1 | 8/2011 | Breton et al. |
| 2011/0243629 A1 | 10/2011 | Roberts et al. |
| 2011/0262711 A1 | 10/2011 | Chopra et al. |
| 2012/0040156 A1 | 2/2012 | Ohashi et al. |

(56) References Cited

U.S. PATENT DOCUMENTS

| | | |
|---|---|---|
| 2012/0086764 A1 | 4/2012 | Golda et al. |
| 2012/0103212 A1 | 5/2012 | Stowe et al. |
| 2012/0103213 A1 | 5/2012 | Stowe et al. |
| 2012/0103216 A1 | 5/2012 | Knisel et al. |
| 2012/0103218 A1 | 5/2012 | Stowe et al. |
| 2012/0103221 A1 | 5/2012 | Stowe et al. |
| 2012/0157561 A1 | 6/2012 | Gould et al. |
| 2012/0309896 A1 | 12/2012 | Carlini et al. |
| 2013/0050366 A1 | 2/2013 | Sasada et al. |
| 2013/0081549 A1 | 4/2013 | Stowe |
| 2013/0085208 A1 | 4/2013 | Norikoshi et al. |
| 2013/0104756 A1 | 5/2013 | Stowe et al. |
| 2013/0223910 A1 | 8/2013 | Anderson |
| 2013/0250688 A1 | 9/2013 | Chen et al. |
| 2013/0278689 A1 | 10/2013 | Sowinski et al. |
| 2013/0305946 A1 | 11/2013 | Iftime et al. |
| 2013/0305947 A1 | 11/2013 | Iftime et al. |
| 2013/0307913 A1 | 11/2013 | Kawashima et al. |
| 2013/0310479 A1 | 11/2013 | Lee et al. |
| 2013/0310517 A1 | 11/2013 | Lee et al. |
| 2013/0324653 A1 | 12/2013 | Bollard et al. |
| 2013/0333094 A1 | 12/2013 | Rogers et al. |
| 2014/0204162 A1 | 7/2014 | Keoshkerian et al. |
| 2014/0235752 A1 | 8/2014 | Gharapetian et al. |
| 2014/0333704 A1 | 11/2014 | Takabayashi et al. |
| 2014/0340455 A1 | 11/2014 | Breton et al. |
| 2015/0070454 A1 | 3/2015 | Moorlag et al. |
| 2015/0077501 A1 | 3/2015 | Breton et al. |
| 2015/0093690 A1 | 4/2015 | Shimura et al. |
| 2015/0116416 A1 | 4/2015 | Belelie et al. |
| 2015/0170498 A1 | 6/2015 | Beggs et al. |
| 2015/0174887 A1 | 6/2015 | Moorlag et al. |
| 2015/0175820 A1 | 6/2015 | Breton et al. |
| 2015/0175821 A1 | 6/2015 | Moorlag et al. |
| 2015/0291847 A1 | 10/2015 | Condello et al. |
| 2016/0035910 A1 | 2/2016 | Wu et al. |
| 2016/0090490 A1 | 3/2016 | Moorlag et al. |
| 2016/0101608 A1 | 4/2016 | Woizeschke |
| 2016/0176185 A1 | 6/2016 | Kanungo et al. |
| 2016/0177113 A1 | 6/2016 | Allen et al. |
| 2016/0195836 A1 | 7/2016 | Chun et al. |
| 2016/0222231 A1 | 8/2016 | Allen et al. |
| 2016/0230027 A1 | 8/2016 | Birau et al. |
| 2016/0236500 A1 | 8/2016 | Fu et al. |
| 2016/0237290 A1 | 8/2016 | Moorlag et al. |
| 2016/0257829 A1 | 9/2016 | Breton et al. |
| 2016/0264798 A1 | 9/2016 | Allen et al. |
| 2016/0333205 A1 | 11/2016 | Lee et al. |
| 2017/0015115 A1 | 1/2017 | Chen et al. |
| 2017/0022382 A1 | 1/2017 | Puñet Plensa et al. |
| 2017/0157918 A1 | 6/2017 | Breton et al. |
| 2017/0158891 A1 | 6/2017 | Allen et al. |
| 2017/0341452 A1 | 11/2017 | Kanungo et al. |
| 2018/0029351 A1 | 2/2018 | Badesha et al. |
| 2018/0050532 A1 | 2/2018 | Stowe et al. |
| 2018/0051183 A1 | 2/2018 | Allen et al. |
| 2018/0105712 A1* | 4/2018 | Birau ................ B41M 1/00 |
| 2018/0163064 A1 | 6/2018 | Birau et al. |
| 2018/0268916 A1 | 9/2018 | Silvestri et al. |
| 2019/0322114 A1 | 10/2019 | Sambhy et al. |
| 2019/0367752 A1 | 12/2019 | Chopra et al. |
| 2019/0367753 A1 | 12/2019 | Chopra et al. |
| 2019/0367754 A1 | 12/2019 | Chopra et al. |
| 2019/0367757 A1 | 12/2019 | Chopra et al. |
| 2019/0383649 A1 | 12/2019 | Abdo et al. |
| 2020/0082759 A1 | 3/2020 | Lee et al. |
| 2020/0145006 A1 | 5/2020 | Lin et al. |
| 2020/0267843 A1 | 8/2020 | Daniels |
| 2020/0282759 A1 | 9/2020 | Sambhy et al. |
| 2020/0307293 A1 | 10/2020 | Sambhy et al. |
| 2020/0308427 A1 | 10/2020 | Claridge et al. |
| 2020/0335149 A1 | 10/2020 | Caporale et al. |
| 2020/0353770 A1 | 11/2020 | Sambhy et al. |
| 2020/0354600 A1 | 11/2020 | Vella et al. |
| 2020/0389981 A1 | 12/2020 | Daniels |
| 2021/0016590 A1 | 1/2021 | Sambhy et al. |
| 2021/0214567 A1 | 7/2021 | Claridge et al. |
| 2021/0237485 A1 | 8/2021 | Terrero et al. |
| 2021/0284851 A1 | 9/2021 | Birau et al. |
| 2022/0063317 A1 | 3/2022 | Sambhy et al. |

FOREIGN PATENT DOCUMENTS

| | | |
|---|---|---|
| EP | 2886618 A1 | 6/2015 |
| EP | 3248804 A1 | 11/2017 |
| EP | 3285121 A2 | 2/2018 |
| EP | 3312246 A1 | 4/2018 |
| EP | 3336150 A1 | 6/2018 |
| EP | 3578373 A1 | 12/2019 |
| EP | 3587509 A1 | 1/2020 |
| JP | 3-69954 A | 3/1991 |
| JP | 2011-208019 A | 10/2011 |
| WO | 99/45077 A1 | 9/1999 |
| WO | 2004/069941 A2 | 8/2004 |
| WO | 2012/028686 A2 | 3/2012 |
| WO | 2013/119539 A1 | 8/2013 |
| WO | 2014/113937 A1 | 7/2014 |
| WO | 2016/073465 A1 | 5/2016 |
| WO | 2019/160961 A1 | 8/2019 |

OTHER PUBLICATIONS

Author Unknown, "Using Conductive Thermal Transfer Ribbons for Printed Electronics," Metallograph white paper, first downloaded on Oct. 23, 2018 from https://spf-inc.com/wp-content/uploads/2016/05/Metallograph-Conductive-Ribbon-White-Paper.pdf, 5 pages.

Office Action dated Mar. 29, 2022 in Canadian application No. 3,105,058, 5 pages.

Bouas-Laurent, H., et al., "Organic Photochromism," IUPAC Technical Report, Pure Appl. Chem., 2001, 73(4):639-665.

BYK-CHEMIE GmbH, BYK-307 Data Sheet, "Silicone-containing surface additive for solvent-free and solvent-borne coating systems, printing inks and adhesive systems, with strong reduction of surface tension. Very good substrate wetting, prevents cratering, and increases surface slip. Solvent-free alternative to BYK-306," Nov. 2012, 4 pages.

Dow, "Describe the Properties of Propylene Glycol," Dow Answer Center, 2017.

Estane® 5703 TPU Lubrizol (Thermoplastic Polyurethane Elastomer (Polyester) Data Sheet supplied by Lubrizol Advanced Materials, Inc., downloaded on Jan. 28, 2019 at https://plastics.ulprospector.com/datasheet/e122063/estane-5703-tpu, 3 pages.

European Communication for European Application No. 14196839.6 dated May 4, 2015, 5 pages.

Flexicon Corporation, "Bulk Handling Equipment and Systems," obtained Jan. 19, 2018.

Extended European Search Report dated Sep. 29, 2020 in European Application No. 20173071.0, 9 pages.

Huntsman Technical Data Sheet Irostic® S 8612, updated Dec. 2011, 1 page.

Huntsman Technical Data Sheet Irostic® S 8743 updated Dec. 2011, 1 page.

Huntsman, Adhesive Thermoplastic Polyurethanes, Irostic®, Huntsman Corporation, 2008, 3 pages.

Juntarasakul et al., "Evaluation of stability and viscosity measurement of emulsion from oil from production in northern oilfield in Thailand," IOP Conference Series: Earth and Environmental Science, 2018, 140(012024).

Leach et al., "The Printing Ink Manual," 5th Edition, Blue Print, New York, 1993, pp. 84-86, 516, 525, 544-550 and 724-726.

Lubrizol Estane® 5703 Ester Based Thermoplastic Polyurethane Data Sheet, downloaded on Jan. 28, 2019 at http://www.matweb.com/search/datasheet_print.aspx?matguid=0c4c562426e64d768e3ee5d294da5fbc, 2 pages.

Lubrizol Pearlstick™ 5703 Technical Data sheet, The Lubrizol Corporation 2018, 1 page.

Michel-Sanchez, E., "Impact of Particle Morphology on the Rheology of PCC-Based Coatings," Aug. 2005 Thesis.

(56) References Cited

OTHER PUBLICATIONS

Requisition dated Jun. 2, 2021 in Canadian Application No. 3,080,298, 4 pages.
Omnexus, "Elongation at Break or Fracture Strain: Technical Properties of Plastics," downloaded on Jan. 28, 2019 at https://omnexus.specialchem.com/polymer-properties/properties/elongation-at-break, 12 pages.
Pusch et al., "Large vol. syringe pump extruder for desktop 3D printers," HardwareX, 2018, 3:49-61.
Extended European Search Report dated Jun. 1, 2021 in European Application No. 20218018.8, 6 pages.
Solmer Soltech Ltd., "Aliphatic Urethane Acrylate" SU 560 Products Information Sheet (date unknown).
Solmer Soltech Ltd., "Aliphatic Urethane Acrylate" SWA 8006W20 Products Information Sheet (date unknown).
Extended European Search Report dated Jul. 21, 2020 in European Application No. 20164051.3, 6 pages.
Author Unknown, Metal and Effect Ink Pigments, 2017, Eckart, Inc., pp. 1-82.
Author unknown, "Silicone Rubber Material Specifications," downloaded Jun. 17, 2019 from https://www.exonicpolymers.com/articles.aspID=266, 5 pages.
Extended European Search Report dated Dec. 21, 2020 in related European Application No. 20182118.8.
Extended European Search Report dated Oct. 2, 2020 in related European Application No. 201730728.
Extended European Search Report dated Sep. 1, 2020 in corresponding European Application No. 20164739.3.
Lewis et al. "Platinum Catalysts Used in the Silicones Industry," Platinum Metals Rev., 1997, 41 (2), 66-75.
Extended European Search Report dated May 25, 2021 in related European Application No. 20182118.8, 15 pages.
Wikipedia, "Silicone rubber," downloaded Jun. 17, 2019 from https://en.wikipedia.org/wiki/silicone_rubber, 11 pages.
Author unknown, Basic Principles of Particle Size Analysis, 2014, Malvern Instruments Worldwide, pp. 1-19.

\* cited by examiner

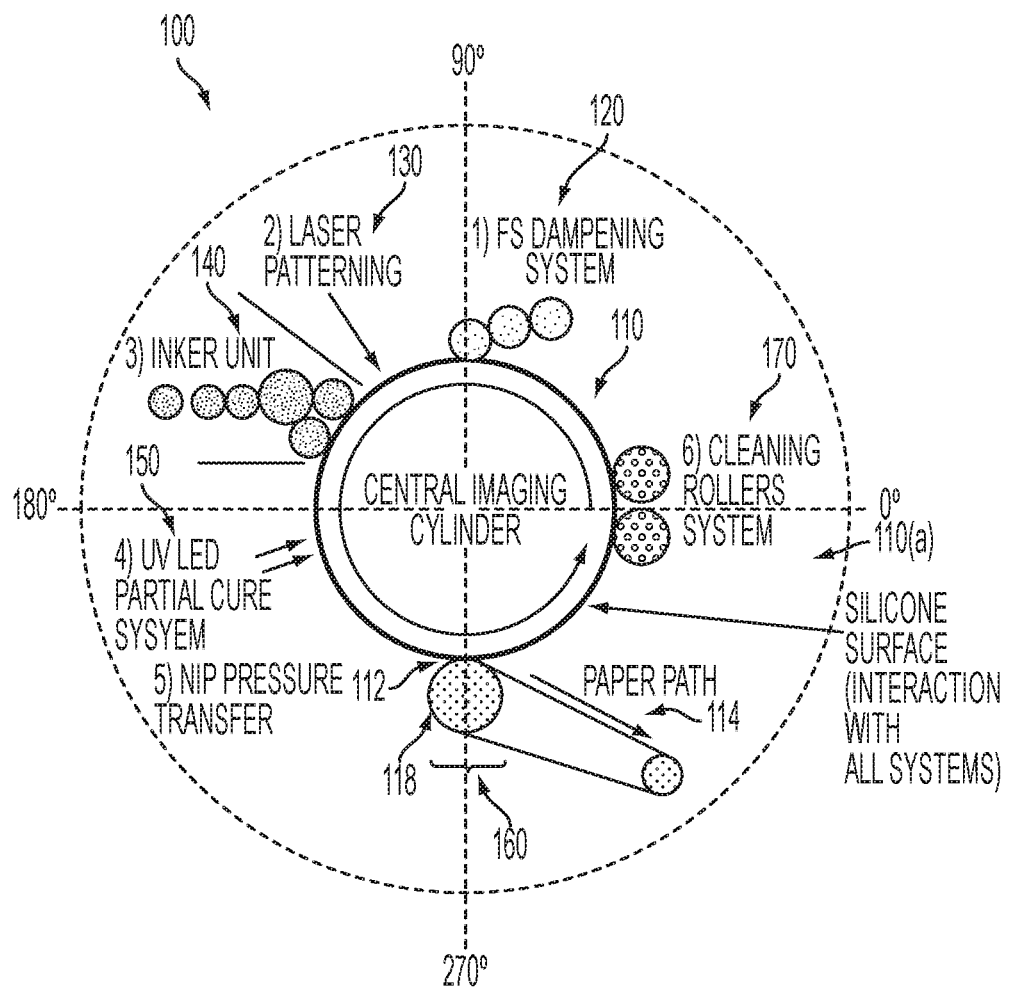

METALLIC INKS COMPOSITION FOR DIGITAL OFFSET LITHOGRAPHIC PRINTING

FIELD OF DISCLOSURE

The present disclosure relates to digital offset printing. In particular, this disclosure relates to metallic ink compositions suitable for digital offset printing, among other printing applications.

BACKGROUND

Typical lithographic and offset printing techniques utilize plates that are permanently patterned, and are, therefore, useful only when printing a large number of copies of the same image, such as magazines, newspapers, and the like. Variable data digital lithography or digital offset lithographic printing has been developed as a system that uses a non-patterned re-imageable surface, which is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned re-imageable surface. Ink applied thereover is retained in the pockets formed by the removal of the dampening fluid. The inked surface is then brought into contact with a substrate, such as paper, plastic or cardboard, and the ink transfers from the pockets in the dampening fluid layer to the substrate. The dampening fluid may then be removed, a new uniform layer of dampening fluid applied to the re-imageable surface, and the process repeated.

Digital offset printing systems use offset-type inks that are specifically designed and optimized to be compatible with the materials the ink is in contact with, including the re-imageable surface and the dampening solution as well as with the various subsystems used during the printing process to enable high quality digital printing at high speed.

For example, an inker subsystem may be used to apply a uniform layer of ink over the layer of dampening fluid. The inker subsystem may use an anilox roller to meter the ink onto one or more ink forming rollers that are in contact with the re-imageable surface. The ink used with this subsystem should have a viscosity that is not so high that anilox-take up and delivery to the re-imageable surface is difficult. However, too low of a viscosity may result in the ink crawling out of the ink loader, resulting in unwanted spills, loss of ink and potential contamination of the printer. Accordingly, digital offset inks should have a certain range of viscosity to afford sufficient and predictable ink cohesion to enable good transfer properties in and among the various subsystems.

There is a growing demand to use digital offset printing for producing metallic special effects on a variety of substrates. Methods useful to produce such effects include metalized cold stamping, which uses a foil that substantially functions as an additional ink. Cold foil stamping is typically accomplished by reconstructing two printing units of an offset press. On the first printing unit, adhesive is pressed onto a paper surface. The metallic foil is transferred to those regions pressed with adhesive, that is, intend □ stamped dots, lines, planes, characters, and images. On the second printing unit, metallic foil passes through the space between a blanket and an impression cylinder. The regions of the paper pressed with adhesive can adhere to the metal layer of cold □ stamping foils, whereas the substrate of the cold-stamping foil and "resting" metal foils in the free region can be collected by a rewinding unit at the top of a third printing unit.

Although metalized cold stamping may be used to create metallic special effects on certain substrates, the construction of metalized cold stamping foil is complex. Moreover, this method is unable to adhere to non-smooth substrates, e.g., textured cardboard. In addition, metalized cold stamping is often wasteful since only small amounts of foil are typically used for metallic effects. Accordingly, there remains a need in the art for metallic inks that meet all of the functional requirements of the sub-systems for digital offset printing, but which are also printable on a variety of substrates with little waste.

SUMMARY

The present disclosure is directed to a metallic ink composition that may be beneficially used to create metallic special effects on a variety of substrates including non-smooth substrates, such as textured plastics, textured cardboard and uncoated paper with 90% transfer efficiency or greater and little waste. More particularly, the present disclosure is directed to a metallic ink composition for use in digital offset printing, including: metallic effect pigment particles, wherein an average equivalent sphere diameter of at least about 90% of the metallic effect pigment particles ranges from greater than 1 micrometer (μm) to 150 μm; at least one dispersant; at least one curable oligomer; and at least one photo initiator, wherein the metallic ink composition has a viscosity ranging from 150,000 to 1,000,000 millipascal seconds (mPa·s) at 0.1 rad/s at 25° C.

Also provided herein is a method of digital offset printing, which method comprises: applying a metallic ink composition onto a re-imageable imaging member surface, the re-imageable imaging member having dampening fluid disposed thereon; forming an ink image; transferring the ink image from the re-imageable surface of the imaging member to a printable substrate; wherein the metallic ink composition comprises: metallic effect pigment particles, wherein an average equivalent sphere diameter of at least about 90% of the metallic effect pigment particles ranges from greater than 1 micrometer (μm) to 150 μm; at least one dispersant; at least one curable oligomer; and at least one photo initiator, wherein the metallic ink composition has a viscosity ranging from 150,000 and 1,000,000 millipascal seconds (mPa·s) at 0.1 rad/s at 25° C.

BRIEF DESCRIPTION OF THE DRAWINGS

FIG. 1 depicts a schematic representation of a related ink-based variable image digital printing system with which the metallic ink compositions according to this disclosure may be used.

DETAILED DESCRIPTION

Exemplary embodiments are described in detail below in formulation and in use. It is envisioned, however, that any system that incorporates features of the methods and compositions, as set forth below may be encompassed by the scope and spirit of the exemplary embodiments.

Exemplary embodiments are intended to cover alternatives, modifications, and equivalents as may be included within the spirit and scope of the compositions and methods described in detail below.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value.

Reference is made to the drawing to accommodate understanding of the compositions and methods of embodiments.

Metallic Effect Pigment Particles

The present disclosure relates to metallic ink compositions that are suitable for use in digital offset printing processes as described herein. In some embodiments, the present metallic ink composition includes metallic effect pigment particles. As used herein, the term "metallic effect" refers to a visual effect. Such visual effects include a visual sensation of a metallic shine, a sparkle effect, a pearlescent effect, a glint effect, a glitter effect or combinations thereof.

In some embodiments, metallic effect pigment particles are composed of metals of Groups 4, 6, 8, 9, 10, 11, 13, and 14 of the periodic table of the elements. Examples of metals and metal alloys, which may be used to obtain the metallic effect pigment particles of the disclosure include aluminum, bronze, brass, chromium, copper, gold, iron, molybdenum, nickel, tin, titanium, zinc and the like.

In some embodiments, the metallic effect pigments particles are produced by ball milling, e.g., a metal, to produce irregularly shaped, metallic flakes (referred to as "cornflakes") or to produce particles having smooth surfaces ("Silverdollars"). During the ball milling process, organic lubricants may be added to avoid the agglomeration of pigment particles.

In other embodiments, the metallic effect pigment particles are produced by vapor depositing e.g., aluminium foils, to produce thin, highly-reflective metallized film, which is removed from a substrate and processed into pigment dispersions.

More typically, however, the metallic effect pigment particles of the disclosure include a substrate coated with an optically active coating. As used herein "an optically active coating" is a coating at which incident light gives rise to perceptible color effects by virtue of physical effects such as reflection, interference, absorption, refraction, etc. Typical optically active coatings include metal oxides, metal oxide hydrates, metals, metal fluorides, metal nitrides, metal oxynitrides or mixtures thereof.

Typical metal oxides and/or metal oxide hydrates include titanium oxide, titanium dioxide, titanium oxide hydrate, aluminum oxide, aluminum oxide hydrate, silicon oxide, silicon dioxide, iron oxide, iron hydroxide, tin oxide, chromium oxide, antimony oxide, cerium oxide and combinations thereof.

Suitable metals for coating the substrate include aluminum, chromium, nickel, silver, gold, titanium, copper and their alloys. Suitable metal fluorides include magnesium fluoride. Suitable metal nitrides or metal oxynitrides include those containing titanium, zirconium and/or tantalum, for example.

The optically active coatings may contain or comprise colorants such as azopigments, phthalocyanines or FD & C dyes/lakes. These colorants may be present in the coating and/or applied to the optically active coating and optionally fixed thereon by adhesion promoters.

The optically active coatings are deposited onto a substrate, which, in some embodiments, may have a thickness ranging from 30-350 nanometers (nm), such as about 50-300 nm, such as about 4 to 40 nm. Typically, the thickness of the optically active coating ranges from about 5 to 30 nm.

In some embodiments, the substrates of the metallic effect pigment particles of the disclosure are natural substrates, e.g., mica. In other embodiments, the substrates are artificial substrates. As used herein, "artificial substrates" are those which do not occur as such in nature, but instead must be synthesized. Suitable artificial substrates include synthetic, nonmetallic, substrates. In some embodiments, the substrates are substantially transparent. In other embodiments, the substrates are transparent. In typical embodiments, the substrates are comprised of glass, synthetic mica and/or $SiO_2$. In some embodiments, the average thickness of the substrates ranges from about 500 nm to 2000 nm, more typically about 750 to 1500 nm.

Suitable substrate shapes include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes, such as a platelet shape.

The metallic effect pigment particles may be present in the metallic ink composition of the instant disclosure in an amount of about 1% to about 15% by weight, such as about 1% to about 5% by weight, such as about 5% to about 10% by weight, based upon the total weight of the metallic ink composition.

In some embodiments, the average equivalent sphere diameter of the metallic effect pigment particles in the present metallic ink composition ranges from greater than 1 micrometer (μm) to 150 μm. As used herein, the term "equivalent sphere diameter" in reference to a particle refers to the diameter of a sphere which has a volume equal to the volume of the measured particle.

The equivalent sphere diameter of a particle may be determined by any suitable means, such as microscopy, sieving, sedimentation or laser diffraction analysis. Typically, laser diffraction analysis is used. Laser diffraction analysis works on the principle that a laser directed through a cell will be diffracted by particles that pass through the beam. Laser diffraction techniques may be used to obtain the diameter of a sphere that yields an equivalent light scattering pattern to the particle being measured. A variety of instruments have been developed by different manufacturers (e.g., Beckman-Coulter, Inc., Retsch, Inc., Horiba Inc., Malvern Inc.), which may be used for this purpose. Suitable Malvern systems include the Malvern MasterSizer S, Malvern 2000, Malvern 2600 and Malvern 3600 series.

As used herein, the term "average equivalent sphere diameter" refers to the mean of the equivalent sphere diameters of individual particles measured. Methods of calculating the average equivalent sphere diameter are known in the art and described, for example, in Malvern Instruments Limited, "Basic Principles of Particle Size Analysis", 2014, pages 1-19, which is herein incorporated by reference in its entirety. The average equivalent sphere diameter (D) may be determined using the equation below, where D is the equivalent sphere diameter of a particle.

$$D[4, 3] = \frac{\sum_1^n D^4, v_i}{\sum_1^n D^3, v_i}$$

In some embodiments, the metallic effect pigments of the present disclosure have a particle size distribution, e.g., wherein at least 90% of the metallic effect pigment particles have an average equivalent sphere diameter that is greater than 1 µm, such as greater than 1 µm to about 150 µm, such as about 35-150 µm, such as about 22-105 µm, such as about 10-65 µm, such as about 5-47 µm. In some embodiments, the metallic effect pigments of the present disclosure have a particle size distribution, e.g., wherein at least 90% of the metallic effect pigment particles have an average equivalent sphere diameter that ranges from about 1-100 µm, such less than about 15 µm, such as from about 5-100 µm, e.g., about 5-25 µm, about 10-60 µm, about 10-80 and about 50-80 µm. The particle size distribution of the present metallic effect pigments can impact the visual effect. For example, larger and coarser particles tend to provide sparkle and gloss, while smaller and finer particles tend to provide more structure and hiding power.

In some embodiments, laser diffraction analysis using, for example, the instruments as described herein, may be used to assess the angle and intensity of laser light scattered by the metallic effect pigment particles of the disclosure, which then may be converted to a volume average particle size distribution using e.g. Mie optical theory or Fraunhofer theory. As used herein, "average particle size" may be expressed as "Dxx" where the "xx" is the volume percent of that particle having a size equal to or less than the Dxx.

For example, a mica based pigment that has a $D_{10}$ value of 5 µm, a $D_{50}$ value of 17 µm and a $D_{90}$ of 37 µm indicates that 10 volume % of the mica particles have an average equivalent spherical diameter $D_{90}$ of up to and including 5 µm, 50 volume % of the particles have an average equivalent spherical diameter $D_{50}$ of up to and including 17 µm, and 90 volume % of the particles have an average equivalent spherical diameter $D_{90}$ of up to and including 37 µm as measured by laser light scattering.

In some embodiments, the metallic effect pigment particles of the instant disclosure can have a particle size distribution, wherein the average equivalent spherical diameter $D_{10}$ ranges from 35 µm to 55 µm, the average equivalent spherical diameter $D_{50}$ ranges from 70 µm to 90 µm and the average equivalent spherical diameter $D_{90}$ ranges from 135 µm to 150 µm as measured by laser light scattering.

In some embodiments, the metallic effect pigment particles can have a particle size distribution wherein the average equivalent spherical diameter $D_{10}$ ranges from 20 µm to 35 µm the average equivalent spherical diameter $D_{50}$ ranges from 50 µm to 60 µm and the average equivalent spherical diameter $D_{90}$ ranges from 95 µm to 105 µm equivalent sphere diameter as measured by laser light scattering.

In some embodiments, the metallic effect pigment particles can have a particle size distribution wherein the average equivalent spherical diameter $D_{10}$ ranges from 10 µm to 20 µm, the average equivalent spherical diameter $D_{50}$ ranges from 25 µm to 35 µm and the average equivalent spherical diameter $D_{90}$ ranges from 55 µm to 65 µm as measured by laser light scattering.

In some embodiments, the metallic effect pigment particles can have a particle size distribution wherein the average equivalent spherical diameter $D_{10}$ ranges from 5 µm to 15 µm the average equivalent spherical diameter $D_{50}$ value ranges from 17 µm to 27 µm and the average equivalent spherical diameter $D_{90}$ ranges from 37 µm to 47 µm as measured by laser light scattering.

Metallic effect pigment particles comprising substrates and optical layers as described herein suitable for use in the present metallic ink compositions are commercially available from, e.g., Eckart Effect Pigments, Division of Altana AG, Wesel, Germany, Sandream Impact LLC of New Jersey USA and Schlenk AG of Germany. Suitable metallic pigment particles include LUXAN® B001 (titanium dioxide and tin oxide coating, Interference Silver), LUXAN® B261 (Interference Blue), LUXAN® B241 (Interference Red), LUXAN® B393 (Combination Gold), LUXAN® B502 (Bronze (Earth Tone)), LUXAN® B512 (Champagne (Earth Tone)), LUXAN® B522 (Copper (Earth Tone)) and LUXAN® B542 (Fire-Red (Earth Tone)). Suitable metallic pigment particles also include those from Sandream Impact LLC pigments such as: Silver White Pearl Pigments including 8110C (Silver Fine); 8100/8100B/8100W (Silver Pearl); 8103 (Rutile Silver Pearl); 8151W (Silver Flash); 8153C (Sparkle Flash); Aluminum based Vivid Color Pigments such as A3152S (silver); A6152S (silver); A2152Y (yellowish fine gold); A3152Y (yellowish gold); A3352Y (luxury gold); A6152Y (yellowish gold); A6352R (copper); A6352Y (luxury gold); Glass Based Lumino Pearls such as Lumino Flash Silver; Interference Pearls such as 8201X (Interference Gold Satin); 8205 (Interference Gold Pearl); 8217 (Interference Copper Pearl); 8249 (Interference Gold Flash); SD-7205 (Ultra Interference Gold); Golden and Metallic Pearls including synthetic Fluorphlogopite based pigments including Lurid White 6999 (Clean White); Lurid White 6980 (Clean White); Lurid White 6900 (Clean White); Lurid Velvet Gold (Golden); Lurid Velvet Bronze (Orange); Lurid Light Gold (Light Gold); Lurid Bronze (Bronze); Aluminum Based Vivid Color Pigments including A3152S; A6152S; A2152Y; A3152Y; A3352Y; A6152Y; A6352R; A6352Y; Lurid Sharp Golden; Lurid Silk Golden; Golden and Metallic Pearl Pigments including 8300W (Pearl Gold); 8302W (Satin Gold); 8303 (Royal Gold); 8304 (Mayan Gold); 8305 (Stellar Gold); 8306 (Olympic Gold); 8318F (Classy Gold); 8323C (Royal Gold Satin); 8351C (Flash Gold); 8355C (Glitter Gold); 8500 (Bronze) 8520F (Satin Bronze); 8530C (Flash Bronze); 8552F (Satin Red Brown) and from Schlenk AG, Grandal 170; Grandal 6900; Grandal 7950; Grandal 7950/95; Offset 6227; Offset 6229; Offset 6234; Offset 6327; Offset UV/6327 and mixtures of the above. Such pigments are particularly desirable due to their pronounced metallic effect and their reduced sensitivity to fracture and flocculation in comparison to other commercially available metallic effect pigments. Thus, these metallic effect pigment particles typically can be processed using high shear mixing methods without a reduction in metallic, e.g., glitter, effect.

Additional Colorants

In some embodiments, the present metallic ink compositions include further colorants, which may be combined with the metallic effect pigment particles of the present disclosure to obtain metallic ink compositions having various hues and chromas. Such further colorants include, for example, other metallic effect pigments, organic or inorganic pigments, dyes or pigmented inks, such as cyan inks.

Suitable dyes include but are not limited to one or more of fluorescent dyes, azo dyes, anthraquinone dyes, xanthene dyes, azine dyes, and combinations thereof. Suitable organic pigments include Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; Pigment Black Number 7, Pigment White Number 8, and/or Pigment Green Number 7. Inorganic pigments may include one or more of the following: mica, fluorphlogopite micas, metal-based silicates including aluminum-calcium-sodium-based silicates, silicas, iron oxides, titanium dioxides, chromium oxides, ferric ammonium ferrocyanides and ferric oxide blacks. Other organic and inorganic pigments and dyes can also be employed, as well as combinations that achieve the colors and/or effects desired.

The additional colorants may be present in the metallic ink composition of the instant disclosure in an amount of about 0% to about 5% by weight, such as about 1% to about 2% by weight, such as about 0.8% to about 1% by weight, based upon the total weight of the metallic ink composition.

In some embodiments, the metal effect pigment particles of the disclosure are dispersed in a suitable dispersant. In embodiments, suitable dispersants include copolymers and block copolymers containing pigment affinic groups, such as amines, esters, alcohols and carboxylic acids. Illustrative examples of suitable dispersants include dispersants selected from EFKA® 4008, EFK® 4009, EFKA® 4047, EFKA® 4520, EFKA® 4010, EFKA® 4015, EFKA® 4020, EFKA® 4050, EFKA® 4055, EFKA® 4080, EFKA® 4300, EFKA® 4330, EFKA® 4400, EFKA® 4401, EFKA® 4403, EFKA® 4406, EFKA® 4800, all available from BASF SE Ludwigshafen, Germany. DISPERBYK® 101, DISPERBYK® 102, DISPERBYK® 107, DISPERBYK® 108, DISPERBYK® 109, DISPERBYK® 110, DISPERBYK® 111, DISPERBYK® 112, DISPERBYK® 115, DISPERBYK® 162, DISPERBYK® 163, DISPERBYK® 164, DISPERBYK® 2001, all available from BYK GmbH, Wesel Germany, SOLSPERSE® 24000 SC/GR, SOLSPERSE® 26000, SOLSPERSE® 32000, SOLSPERSE® 36000, SOLSPERSE® 39000, SOLSPERSE® 41000, SOLSPERSE® 71000 all available from Lubrizol Advanced Materials, Inc. Wickliffe, Ohio or mixtures or combinations thereof. Typically, SOLSPERSE® 41000 is used.

The dispersant may be present in the metallic ink composition of the instant disclosure in an amount of about 0% to about 20% by weight, such as about 1% to about 10% by weight, such as about 2% to about 3% by weight, based upon the total weight of the metallic ink composition.

In some embodiments, the metallic ink composition of the present disclosure includes further components such as a suitable curable monomer. Examples of suitable materials include radically curable monomer compounds, such as acrylate and methacrylate monomer compounds. Specific examples of acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate and the like, as well as mixtures or combinations thereof.

In specific embodiments, propoxylated (6) trimethylolpropane triacrylate such as SR501 from Sartomer Co. (a subsidiary of Arkema S.A., Colombes, France) is used. The monomers may be present in the metallic ink composition of the present disclosure in an amount from about 0% to about 50% by weight, such as about 1% to about 30% by weight, such as about 5% to about 30% by weight, such as about 5% to about 10% by weight, based upon the total weight of the present metallic ink composition.

In some embodiments, the metallic ink composition of the present disclosure includes a curable oligomer. Suitable curable oligomers include, but are not limited to acrylated polyesters, acrylated polyethers, acrylated epoxies, urethane acrylates, and pentaerythritol tetraacrylate. Specific examples of suitable acrylated oligomers include, but are not limited to, acrylated polyester oligomers from Sartomer Co. a subsidiary of Arkema S.A., Colombes, France such as CN2255, CN2282, CN294E; from Allnex Inc., Ebecryl 657, Ebecryl 1657 and Ebecryl 2870 and the like, acrylated urethane oligomers, such as CN9010, acrylated epoxy oligomers, such as CN2204, CN110, CN118® (Sartomer Co.), and Ebecryl 2870 (Allnex Inc.) and the like; and mixtures and combinations thereof. The oligomers may be present in the metallic ink composition in an amount of about 0% to about 90% by weight, such as about 50% to about 85% by weight, such as about 60% to 80% based upon the total weight of the present metallic ink composition.

In some embodiments, the present metallic ink composition includes a photo-initiator, such as an α-hydroxyketone photo-initiator (including α-hydroxyketone photoinitators sold under the trade name OMNIRAD® 184, OMNIRAD® 500, OMNIRAD® 1173, and OMNIRAD® 2959, IGM Group B.V. Waalwijk, The Netherlands), α-aminoketone photo-initiators (including OMNIRAD® 369, OMNIRAD® 379, IGM Group BV) and bisacyl phosphine photo-initiators (including bisacyl phospine photo-initiators sold under the trade name OMNIRAD® 819, OMNIRAD® 819DW, IGM Group B.V.). Other suitable photo-initiators include monoacylphosphine oxide and bisacylphosphine oxide, such as 2,4,6-trimethylbenzoybiphenylphosphine oxide (manufactured by BASF under the trade name LUCIRIN® TPO); ethyl-2,4,6-trimethylbenzoylphenyl phosphinate (manufactured by BASF under the trade name LUCIRIN® TPO-L); and oligo[2-hydroxy-2-methyl-1-[4-(1-methylvinyl)phenyl] propanone] (available as Esacure KIP 150 from Lamberti); and the like, as well as mixtures thereof.

The photo-initiator may be present in the metallic ink composition of the instant disclosure in an amount of about 0% to about 12% by weight, such as about 1% to about 10%, by weight such as about 4% to about 7% by weight, based upon the total weight of the metallic ink composition.

In some embodiments, the metallic ink composition of the present disclosure comprises a thermal stabilizer, such as GENORAD® 16, GENORAD® 22 available from Rahn AG, Switzerland, IRGASTAB® UV22 available from BASF or CN3216 available from Sartomer Co. The thermal stabilizer may be present in the metallic ink composition in an amount of about 0% to about 5% by weight, such as from about 0.5% to about 4% by weight, such as about 0.8% to about 2% by weight, based upon the total weight of the present metallic ink composition.

In some embodiments, the metallic ink composition of the present disclosure includes fillers. Suitable fillers may include, but are not limited to, amorphous, diatomaceous, fumed quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like. In specific embodiments, the filler may be clays from BYK CLAYTONE HA, CLAYTONE PI and CLAYTONE HY. In some embodiments, filler may be present in the metallic ink composition of the present disclosure in an amount from about 0% to about 10% by weight, such as about 1% to about 6% by weight, such as from about 2% to about 4% by weight, based upon the total weight of the present metallic ink composition.

In some embodiments, the metallic ink composition of the present disclosure has a viscosity similar to that of conventional inks for digital offset printing applications. For example, in some embodiments the viscosity ranges from about 150,000 and 1,000,000 mPa·s at 0.1 rad/s at 25° C., more typically the viscosity ranges from 150,000 to 200,000 mPa·s at 0.1 rad/s at 25° C. In some embodiments, the viscosity ranges from about 150,000 and 1,000,000 mPa·s at 0.1 rad/s at 25° C., more typically the viscosity ranges from 150,000 to 200,000 mPa·s at 0.1 rad/s at 25° C. In other embodiments, the present metallic ink compositions have a second viscosity at a higher temperature. For example, in embodiments the viscosity ranges from about 50,000 and 170,000 mPa·s at 100 rad/s at 35° C., more typically the viscosity ranges from 70,000 to 90,000 mPa·s at 100 rad/s at 35° C.

The present disclosure further provides a method of digital offset printing, which includes applying the metallic ink composition of the present disclosure onto a re-imageable imaging member surface, the re-imageable imaging member having dampening fluid disposed thereon; forming an ink image; and transferring the ink image from the re-imageable surface of the imaging member to a printable substrate.

An exemplary digital offset printing architecture is shown in FIG. 1. As seen in FIG. 1, an exemplary system 100 may include an imaging member 110. The imaging member 110 in the embodiment shown in FIG. 1 is a drum, but this exemplary depiction should not be interpreted so as to exclude embodiments wherein the imaging member 110 includes a plate or a belt, or another now known or later developed configuration. The re-imageable surface 110(a) may be formed of materials including, for example, a class of materials commonly referred to as silicones, including flurosilicone, among others. The re-imageable surface may be formed of a relatively thin layer over a mounting layer, a thickness of the relatively thin layer being selected to balance printing or marking performance, durability and manufacturability.

U.S. patent application Ser. No. 13/095,714 ("714 Application"), titled "Variable Data Lithography System," filed on Apr. 27, 2011, by Timothy Stowe et al., which is commonly assigned, and the disclosure of which is hereby incorporated by reference herein in its entirety, depicts details of the imaging member 110 including the imaging member 110 being comprised of a re-imageable surface layer 110(a) formed over a structural mounting layer that may be, for example, a cylindrical core, or one or more structural layers over a cylindrical core.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 includes, but is not limited to, any particular composition or form such as, for example, paper, plastic, folded paperboard, Kraft paper, clear substrates, metallic substrates or labels. The medium substrate further may include non-smooth substrates, such as textured cardboard, textured plastic or uncoated paper. The exemplary system 100 may be used for producing images on a wide variety of image receiving media substrates. The 714 Application also explains the wide latitude of marking (printing) materials that may be used.

The exemplary system 100 includes a dampening fluid system 120 generally comprising a series of rollers, which may be considered as dampening rollers or a dampening unit, for uniformly wetting the re-imageable surface of the imaging member 110 with dampening fluid. A purpose of the dampening fluid system 120 is to deliver a layer of dampening fluid, generally having a uniform and controlled thickness, to the re-imageable surface of the imaging member 110. It is known that a dampening fluid such as fountain solution may comprise mainly water optionally with small amounts of isopropyl alcohol or ethanol added to reduce surface tension as well as to lower evaporation energy necessary to support subsequent laser patterning, as will be described further below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane), and D4 (octamethylcyclotetrasiloxane). Other suitable dampening fluids are disclosed, by way of example, in co-pending U.S. patent application Ser. No. 13/284,114, filed on Oct. 28, 2011, titled "Dampening Fluid For Digital Lithographic Printing," the disclosure of which is hereby incorporated herein by reference in its entirety.

Once the dampening fluid is metered onto the re-imageable surface of the imaging member 110, a thickness of the dampening fluid may be measured using a sensor (not shown) that may provide feedback to control the metering of the dampening fluid onto the re-imageable surface of the imaging member 110 by the dampening fluid system 120.

After a precise and uniform amount of dampening fluid is provided by the dampening fluid system 120 on the re-imageable surface of the imaging member 110, an optical patterning subsystem 130 may be used to selectively form a latent image in the uniform dampening fluid layer by imagewise patterning the dampening fluid layer using, for example, laser energy. Typically, the dampening fluid will not absorb the optical energy (IR or visible) efficiently. The re-imageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the re-imageable surface of the imaging member 110 is presented to an inker subsystem 140. The inker subsystem 140 is used to apply a uniform layer of ink over the layer of dampening fluid and the re-imageable surface layer of the imaging member 110. The inker subsystem 140 may use an anilox roller to meter an offset lithographic ink, such as the metallic ink compositions of the present disclosure, onto one or more ink forming rollers that are in contact with the re-imageable surface layer of the imaging member 110. Separately, the inker subsystem 140 may include other traditional elements such as a series of metering rollers to provide a precise feed rate of ink to the reimageable surface. The inker subsystem 140 may deposit the ink to the pockets representing the imaged portions of the re-imageable surface, while ink on the unformatted portions of the dampening fluid will not adhere to those portions.

The cohesiveness and viscosity of the ink residing in the re-imageable layer of the imaging member 110 may be modified by a number of mechanisms. One such mechanism may involve the use of a rheology (complex viscoelastic modulus) control subsystem 150. The rheology control system 150 may form a partial crosslinking layer of the ink on the re-imageable surface to, for example, increase ink cohesive strength relative to the re-imageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the re-imageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the re-imageable surface of the imaging member 110 is brought into physical contact with the substrate 114. With the adhesion of the ink, such as the metallic ink composition of the present disclosure, having been modified by the rheology control system 150, modified adhesion of the ink causes the ink to adhere to the substrate 114 and to separate from the re-imageable surface of the imaging member 110. Careful control of the temperature and pressure conditions at the transfer nip 112 may allow transfer efficiencies for the ink, such as the metallic ink composition of the present disclosure, from the re-imageable surface of the imaging member 110 to the substrate 114 to exceed 90%, such as to exceed 95%. While it is possible that some dampening fluid may also wet substrate 114, the volume of such a dampening fluid may be minimal, and may rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid may be removed from the re-imageable surface of the imaging member 110, typically without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 Application describes details of such a cleaning subsystem 170 including at least a first cleaning member such as a sticky or tacky member in physical contact with the re-imageable surface of the imaging member 110, the sticky or tacky member removing residual ink and any remaining small amounts of surfactant compounds from the dampening fluid of the re-imageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the re-imageable surface of the imaging member 110 may be facilitated. Regardless of the cleaning mechanism, however, cleaning of the residual ink and dampening fluid from the re-imageable surface of the imaging member 110 may be used to prevent ghosting in the system. Once cleaned, the re-imageable surface of the imaging member 110 is again presented to the dampening fluid system 120 by which a fresh layer of dampening fluid is supplied to the re-imageable surface of the imaging member 110, and the process is repeated.

The metallic ink composition in accordance with the present disclosure is not limited to use in digital offset printing. The metallic ink composition disclosed herein may also be useful in conventional offset printing or hybrid conventional offset and digital offset printing systems. Nonetheless, the metallic ink compositions of the present disclosure meet systems requirements that are unique to digital offset printing systems. In particular, the present metallic ink compositions satisfy wetting and release requirements imposed by the re-imageable imaging member 110 of ink-based digital printing systems. Further, the metallic ink compositions of the present disclosure are compatible with dampening fluids suitable for ink-based digital printing, including non-aqueous dampening fluids. The metallic ink compositions of the present disclosure are also enabled for transfer from an ink delivery system such as anilox roll to the imaging member, e.g., re-imageable offset plate.

EXAMPLES

Example 1. Preparation of Ink Base

An ink base was prepared by adding 2.28 kilograms (kg) of a tetra-functional acrylated polyester oligomer (CN294E, available from Sartomer of Arkema Inc.), 1.2 kg of an acid modified epoxy acrylate oligomer (CN118, Sartomer) and 0.28 kg of an aliphatic urethane acrylate oligomer having an acrylate functionality of 6 (CN9010, Sartomer) to a five gallon stainless steel vessel. The mixture was allowed to heat to 80° C. upon which low speed stirring commenced using a 7 inch wide anchor impeller. Stirring was continued until the mixture reached ~90° C. After about 45 minutes of stirring, total homogeneity of the solution was observed. 0.24 kg OMNIRAD® TPO (IGM Resins, Inc.) was then slowly added to the homogenate over an approximately 15 minute time period. After an additional 60 minutes of mixing, the solution was discharged into a black 1 gallon high density polyethylene pail to reveal a dark-amber homogeneous solution with no visible air bubbles.

Example 2. Ink Based Compositions (Preparations 10, 11, 12 and 16)

86 grams (g) of ink base, prepared as described above in Example 1, 3 grams (g) of dispersant and 1 g of thermal stabilizer were added to a stainless steel beaker. The beaker was placed onto a hot plate, fitted with an overhead mixer containing an anchor impeller. The heating on the hotplate was then increased to 100° C. When the ink components in the beaker reached 50° C., mixing commenced at 100 rotations per minute (rpm). When the ink component mixture reached 90° C., 10 g of pigment(s) were gradually added to the beaker. Once the pigment addition was complete, the ink was allowed to mix at 100 rpm, at 90° C. for 1 hour. The ink was subsequently mixed for another hour at 600 rpm at the same temperature. Subsequently, the mixing speed and temperature were reduced to 100 rpm and 50° C., respectively. Once the temperature of the ink reached 50° C., it was discharged into a brown bottle. Components of exemplary metallic ink formulations, prepared as described above, are shown below in Table 1 (Preparation 10) and Table 2 (Preparations 11, 12, 16).

Example 3. Concentrate Preparation of Aluminum Pigments (Ink Preparations 18 and 19)

In a 500 mL stainless steel vessel equipped with an anchor impeller, the following were added: 90 g of SARTOMER SR501, and 30 g of SARTOMER CN2282. After the contents of the vessel reached 40° C., low speed mixing commenced and held for 15 minutes. With the speed of the impeller to 100 rpm, 90 g of gently pre-ground Grandal 170 available from Schlenk AG were slowly added to the vessel ensuring proper wetting of the pigment. The formed pigment concentrate was qualitatively transferred in one pass to a 3 roll mill from Kent Industrial USA with the speed of the apron roll set to 200 rpm. The milled concentrate was collected in a clean amber glass bottle.

Example 4. Ink Preparation from Aluminum Pigment Concentrate (Ink Preparations 18 and 19)

In a 250 mL beaker, 78.75 g CN294E (from Sartomer), 1.5 g CN3216 (Sartomer) and 5.25 g Additol LX (Allnex Inc) were added and heated to 80° C. while mixing slowly with an anchor impeller. After 30 minutes of mixing, 12 g of pre-ground CN2256 (Sartomer) were slowly added to the solution. The solution was allowed to stir for 1 hour upon which heating and stirring discontinued to form Solution 4A. In a 100 mL beaker equipped with a mini anchor impeller the following were added: 19.5 g of Solution 4A and 10.5 g of Example 3 concentrate. The vessel was heated to 40° C., the low mixing of these components occurred for 60 minutes at 100 rpm upon which the metallic ink was discharged into a glass amber bottle. Components of exemplary metallic ink formulations, prepared as described above, are shown below in Table 3 (Preparations 18 and 19).

Example 5. Ink Preparation Using the Acoustic Mixer (Ink Preparations 1, 2, 3, 4, 5, 6, 7, 8, 9, 13, 14 and 15)

In a 150 mL polyethylene bottle the following were added: the pigment(s), the dispersant, the monomer, the oligomers, the photoinitiators, the thermal stabilizer and the clay. The bottle was securely placed inside the RESODYN™ Acoustic Mixer (RAM) and the bottle's contents were thoroughly mixed for 10 minutes at 60 Hz at an acceleration range between 80 to 105 G's at 90% intensity. At the end of process, the ink was discharged into a stainless steel beaker and gently mixed using a mini anchor impeller at 80° C. for 1 hour to ensure that the photoinitiators were fully dissolved and incorporated into the composition. The ink was then discharged into an amber glass bottle. Components of exemplary metallic ink formulations, prepared as described above, are shown below in Table 1 (Preparations 1, 2, 3, 4, 5, 6, 7, 8, 9) and Table 2 (Preparations 13, 14, 15).

Example 6i. (Preparation 17)

Based on a total 400 gram scale of preparation for a cyan ink composition, 4.5% wt. of SOLSPERSE 39000, 65% wt. of CN294E, 5.49% of SR501, and 1% wt. of CN3216 were added to a 1 liter stainless steel vessel and placed on a heating mantle (available from IKA®) together with a thermocouple and stirrer apparatus (also available from IKA®) and equipped with an anchor impeller. The components in the vessel (dispersant, acrylates, and stabilizer) were then stirred at 200 RPM for 30 minutes at 80° C. Thereafter, photoinitiators (2% wt. Irgacure 379, 0.39% wt. Irgacure 819, 1% wt. Irgacure 184, and 3.62% wt. Esacure Kip 150) were added slowly to the vessel and stirred at about 80° C. for another hour. With the components in the vessel solubilized, 15% wt. of Heliogen Blue D 7088 pigment was added to the vessel and stirred more vigorously but not to the point where air was entrained into the mixture. The pigmented mixture was allowed to stir for about 30 minutes at about 400 RPM at which point 2% wt. Claytone HY was added slowly to the pigmented mixture at a reduced RPM and then re-stirred for about another 15 minutes at about 400 RPM. The vessel containing the mixed components was then transferred to a high speed shearing mill (available from the Hockmeyer Equipment Corporation) equipped with a 40 mm diameter high shear Cowles blade and stirred at 5300 RPM for about an hour to form COMPONENT MIXTURE 6A. COMPONENT MIXTURE 6A was then qualitatively transferred to a 3-roll mill apparatus (manufactured by Kent Machine Works) where COMPONENT MIXTURE 6A was passed through the 3-roll mill first at an input apron roll speed of 400 RPM for a first pass and then at an input apron roll speed of 200 RPM for a second pass to form COMPONENT MIXTURE 6B forming the Example 6i cyan acrylate ink composition.

Example 6ii. (Preparation 17)

86 grams (g) of ink base, prepared as described above in Example 1, 3 grams (g) of dispersant and 1 g of thermal stabilizer were added to a stainless steel beaker. The beaker was placed onto a hot plate, fitted with an overhead mixer containing an anchor impeller. The heating on the hotplate was then increased to 100° C. When the ink components in the beaker reached 50° C., mixing commenced at 100 rotations per minute (rpm). When the ink component mixture reached 90° C., 10 g of Gold Pigment LUXAN® CFX B393 pigment particles were gradually added to the beaker. Once the pigment addition was complete, the ink was allowed to mix at 100 rpm, at 90° C. for 1 hour. At this point, 0.81 g of Example 6i ink was added to the mixture with stirring continuing at 90° C. for an additional 30 minutes. The mixed pigmented ink received further mixing for another hour at 600 rpm at 90° C. Subsequently, the mixing speed and temperature were reduced to 100 rpm and 50° C., respectively, upon which it was discharged into a brown bottle. Components of the exemplary metallic ink formulation, prepared as described above, are shown below in Table 2 (Preparation 17).

TABLE 1

Formulated Inks with Singular Pigment Grade

| Preparation Number | 1 | 2 | 3 | 4 | 5 | 6 | 7 | 8 | 9 | 10 |
|---|---|---|---|---|---|---|---|---|---|---|
| Resodyn Processed | Yes | Yes | Yes | Yes | Yes | Yes | Yes | Yes | Yes | No |
| Pigment Grade | Lurid Velvet Gold | Lurid Velvet Gold | Lurid Velvet Bronze | Lurid Velvet Bronze | Lurid Velvet Gold | 8522F Bronze | 8318F Gold | 8318F Gold | 8318F Gold | Gold Pigment LUXAN® CFX B393 |
| Dispersant Grade | Solsperse J180 | Solsperse 17000 | Solsperse 17000 | K-sperse A-504 | Solsperse J180 | Solsperse 17000 | Solsperse J180 | Solsperse 17000 | Solsperse 17000 | Solsperse 41000 |
| Pigment* | 19.88 | 14.99 | 14.99 | 14.99 | 19.88 | 19.98 | 19.88 | 19.88 | 19.88 | 10 |
| Dispersant* | 2.29 | 3.30 | 3.30 | 3.30 | 2.29 | 3.30 | 2.29 | 2.29 | 5.27 | 3.0 |
| Sartomer CN2256* | 4.47 | 5.00 | 5.00 | 5.00 | 4.47 | 5.00 | 4.47 | 4.47 | 4.47 | — |
| Sartomer CN 118* | — | — | — | — | — | — | — | — | — | 25.8 |
| Sartomer CN 9010* | — | — | — | — | — | — | — | — | — | 6.07 |
| Sartomer CN294E* | 57.66 | 59.95 | 59.95 | 59.95 | 57.66 | 54.95 | 57.66 | 57.66 | 49.71 | 49.07 |
| Sartomer SR501* | 5.77 | 6.79 | 6.79 | 6.79 | 5.77 | 6.79 | 5.77 | 5.77 | 10.74 | — |
| Irgacure 379* | 1.99 | 2.00 | 2.00 | 2.00 | 1.99 | 2.00 | 1.99 | 1.99 | 1.99 | — |
| Irgacure 819* | 1.38 | 1.39 | 1.39 | 1.39 | 1.38 | 1.39 | 1.38 | 1.38 | 1.38 | — |
| Esacure KIP 150* | 3.58 | 3.60 | 3.60 | 3.60 | 3.58 | 3.60 | 3.58 | 3.58 | 3.58 | — |
| Omnirad TPO | — | — | — | — | — | — | — | — | — | 5.06 |
| Sartomer CN3216* | 0.99 | 1.00 | 1.00 | 1.00 | 0.99 | 1.00 | 0.99 | 0.99 | 0.99 | — |
| Genorad 16* | — | — | — | — | — | — | — | — | — | 1.0 |
| Claytone HY* | 1.99 | 2.00 | 2.00 | 2.00 | 1.99 | 2.00 | 1.99 | 1.99 | 1.99 | — |
| Total | 100 | 100 | 100 | 100 | 100 | 100 | 100 | 100 | 100 | 100 |

TABLE 2

Formulated Inks with Mixed Pigment Grades or mixed inks (wt %)

| Preparation Number | 11 | 12 | 13 | 14 | 15 | 16 | 17 |
|---|---|---|---|---|---|---|---|
| Resodyn Processed | No | No | Yes | Yes | Yes | No | No |
| Pigment #1 Grade | Gold Pigment LUXAN® CFX B393 | Silver Pigment LUXAN® B001 | L8318F | MICA L8318F and PY 14 | 8522F Bronze | L8318F | Gold Pigment LUXAN® CFX B393 |
| Pigment #2 Grade | Silver Pigment LUXAN® B001 | Clariant PO 34 | Clariant PY14 | Clariant PY14 | Clariant PR57:1 | Lurid Velvet Gold | — |
| Second Ink preparation | — | — | — | — | — | — | Example # 6i |
| Dispersant Grade | Solsperse 41000 | Solsperse 41000 | Solsperse 17000 | Solsperse 17000 | Solsperse 17000 | Solsperse 17000 | Solsperse 41000 |
| Pigment #1* | 5 | 9.90 | 9.94 | 1.24 | 0.62 | 7.46 | 9.92 |
| Pigment #2* | 5 | 1.00 | 9.94 | 18.64 | 19.26 | 12.43 | — |
| Ink* | — | — | — | — | — | — | 0.8 |
| Dispersant | 3 | 3.0 | 6.96 | 6.96 | 6.96 | 6.96 | 2.97 |
| Sartomer CN2256* | — | — | 4.47 | 4.47 | 4.47 | 4.47 | — |
| Sartomer CN118* | 25.8 | 25.8 | — | — | — | — | 25.59 |
| Sartomer CN 9010* | 6.07 | 6.07 | — | — | — | — | 6.02 |
| Sartomer CN294E* | 49.07 | 49.07 | 48.02 | 48.02 | 48.02 | 48.02 | 48.68 |
| Sartomer SR501* | — | — | 10.74 | 10.74 | 10.74 | 10.74 | — |
| Irgacure 379* | — | — | 1.99 | 1.99 | 1.99 | 1.99 | — |
| Irgacure 819* | — | — | 1.38 | 1.38 | 1.38 | 1.38 | — |
| Esacure KIP 150* | — | — | 3.58 | 3.58 | 3.58 | 3.58 | — |

TABLE 2-continued

Formulated Inks with Mixed Pigment Grades or mixed inks (wt %)

| Preparation Number | 11 | 12 | 13 | 14 | 15 | 16 | 17 |
|---|---|---|---|---|---|---|---|
| Omnirad TPO* | 5.06 | 5.06 | — | — | — | — | 5.01 |
| Sartomer CN3216* | — | — | 0.99 | 0.99 | 0.99 | 0.99 | — |
| Genorad 16* | 1.0 | 1.0 | — | — | — | — | 0.99 |
| Total | 100 | 100 | 100 | 100 | 100 | 100 | 100 |

*Numbers in rows weight %.

TABLE 3

Components of preparations 18 and 19

| | Preparation Number | |
|---|---|---|
| | 18 | 19 |
| Resodyn Processed | No | No |
| Pigment Grade | Schlenk Grandal 170 | Schlenk Grandal 170 |
| Pigment* | 15.0 | 10.0 |
| Sartomer CN2256* | 8.0 | 3.0 |
| Sartomer CN2282* | 62.5 | 67.5 |
| Sartomer SR501* | 10.0 | 15.0 |
| Additol LX* | 3.5 | 3.5 |
| Sartomer CN3216* | 1.0 | 1.0 |
| Total | 100 | 100 |

*Numbers rows weight %.

Example 8. Rheology

Rheology of some of the ink compositions prepared as described above were measured on a DHR-2 rheometer (TA Instruments, New Castle, Del.) at 25° C. and 35° C. using a parallel plate with a 500 micron gap. Table 4, below, describes the viscosity of selected metallic ink compositions at very low (0.1 rad/s), low (1 rad/s) and at high (100 rad/s) frequencies. It is desired that successful transfer of ink from an ink donor roll, such as an anilox roll, to the receiving blanket can be accomplished at temperatures ranging from about 20° C. to about 40° C. The obtained viscosities of the Example Preparation inks are suitable for use with digital offset printing of the disclosure.

TABLE 4

Example Ink Rheology at 25° C.

| | 25° C. Complex Viscosity (mPa · s) at angular frequency: | | |
|---|---|---|---|
| Preparation # | 0.1 rad/s | 1 rad/s | 100 rad/s |
| 10 | 1.52E+05 | 1.52E+05 | 1.52E+05 |
| 11 | 1.62E+05 | 1.63E+05 | 1.59E+05 |
| 12 | 1.85E+05 | 1.88E+05 | 1.84E+05 |
| 17 | 1.71E+05 | 1.71E+05 | 1.65E+05 |

TABLE 5

Example Ink rheology at 35 ° C.

| | 35° C. Complex Viscosity (mPa · s) at angular frequency: | | |
|---|---|---|---|
| Preparation # | 0.1 rad/s | 1 rad/s | 100 rad/s |
| Comparative example 1, Eckart Topstar UV 21 0011 | 5.87E+06 | 9.76E+05 | 2.73E+04 |
| Comparative example 2, Schlenk Lithobright UV183-77 | 5.27E+06 | 7.88E+05 | 2.21E+04 |
| Comparative example 3, Metalstar UV Select 21 2077 | 8.38E+06 | 1.17E+06 | 3.32E+04 |
| 18 | 5.62E+06 | 9.67E+05 | 7.09E+04 |
| 19 | 8.72E+06 | 1.56E+06 | 8.56E+04 |

Based on the rheologies of the inks in Table 5, the example preparation inks 18 and 19 have significantly higher complex viscosity at higher angular frequency such as at 100 rads/s compared to the three commercial comparative example UV offset inks. It is also evident at lower angular frequencies such as at 0.1 rads/s that the Comparative Example inks and the Preparation inks have similar complex viscosity which indicates the much higher shortness index or shear thinning behavior of the Comparative Example inks over the Preparation inks making the Comparative Example inks less suitable for successful printing in the printing process described in this disclosure.

It will be appreciated that the above-disclosed and other features and functions, or alternatives thereof, may be desirably combined into many other different compositions or formulations, systems or applications. Also, various presently unforeseen or unanticipated alternatives, modifications, variations or improvements therein may be subsequently made by those of skill in the printing and ink arts.

What is claimed is:

1. A metallic ink composition for use in digital offset printing, comprising:
    metallic effect pigment particles, wherein an average equivalent sphere diameter of at least about 90% of the metallic effect pigment particles ranges from greater than 1 micrometer (μm) to 150 μm;
    at least one dispersant;
    at least one curable oligomer; and
    at least one photo initiator,
    wherein the metallic ink composition has a first viscosity ranging from 150,000 to 1,000,000 millipascal seconds (mPa·s) at 0.1 rad/s at 25° C. and a second viscosity ranging from and 85,600 mPa·s at 100 rad/s at 35° C.,
    wherein the metallic ink composition further comprises an additional colorant, and wherein the additional colorant is an organic white pigment in an amount ranging from 0 to 5% by weight.

2. The metallic ink composition of claim 1, wherein the metallic effect pigment particles comprise a substrate and an optically active coating.

3. The metallic ink composition of claim 2, wherein the optically active coating is selected from the group consisting of metal oxides, metal oxide hydrates, metals, metal fluorides, metal nitrides, metal oxynitrides and mixtures thereof.

4. The metallic ink composition of claim 3, wherein the metal oxides are selected from the group consisting of titanium oxide, titanium dioxide, aluminum oxide, silicon dioxide, iron oxide, tin oxide, chromium oxide, antimony oxide, cerium oxide and combinations thereof.

5. The metallic ink composition of claim 2, wherein the optically active coating is selected from the group consisting of titanium dioxide, iron oxide, silicon dioxide and combinations thereof.

6. The metallic ink composition of claim 2, wherein the substrate comprises a glass flake.

7. The metallic ink composition of claim 1, wherein the metallic effect pigment particles have an average equivalent spherical diameter $D_{10}$ ranging from about 10-20 μm, an average equivalent spherical diameter $D_{50}$ ranging from about 25-35 μm and an average equivalent spherical diameter $D_{90}$ ranging from about 55-65 μm as measured by laser light scattering.

8. The metallic ink composition of claim 1, wherein the metallic effect pigment particles have an average equivalent spherical diameter $D_{10}$ ranging from about 5-15 μm, an average equivalent spherical diameter $D_{50}$ ranging from about 17-27 μm and an average equivalent spherical diameter $D_{90}$ ranging from about 37-47 μm as measured by laser light scattering.

9. The metallic ink composition of claim 1, wherein a determination of the average equivalent sphere diameter comprises laser light scattering.

10. The metallic ink composition of claim 1, wherein the metallic ink composition further comprises an additional colorant selected from an orange, blue, violet, black, green, yellow and/or red organic pigment, an inorganic pigment and/or a dye.

11. The metallic ink composition of claim 1, wherein the first viscosity of the metallic ink composition ranges from 150,000 to 200,000 mPa·s at 0.1 rad/s at 25° C.

12. The metallic ink composition of claim 1, wherein the metallic ink composition further comprises a thermal stabilizer.

13. A method of digital offset printing, which method comprises:
applying a metallic ink composition onto a surface of a re-imageable imaging member, the re-imageable imaging member having dampening fluid disposed thereon;
forming an ink image;
transferring the ink image from the re-imageable surface of the imaging member to a printable substrate;
wherein the metallic ink composition comprises:
metallic effect pigment particles, wherein an average equivalent sphere diameter of at least about 90% of the metallic effect pigment particles ranges from greater than 1 micrometer (μm) to 150 μm;
at least one dispersant;
at least one curable oligomer; and
at least one photo initiator,
wherein the metallic ink composition has a first viscosity ranging from 150,000 and 1,000,000 millipascal seconds (mPa·s) at 0.1 rad/s at 25° C. and a second viscosity ranging from and 85,600 mPa·s at 100 rad/s at 35° C.,
wherein the metallic ink composition further comprises an additional colorant, and wherein the additional colorant is an organic white pigment in an amount ranging from 0 to 5% by weight.

14. The method of claim 13, wherein the metallic effect particles have an average equivalent spherical diameter $D_{10}$ ranging from about 10-20 μm, an average equivalent spherical diameter $D_{50}$ ranging from about 25-35 μm and an average equivalent spherical diameter $D_{90}$ ranging from about 55-65 μm as measured by laser light scattering.

15. The method of claim 13, wherein the metallic effect particles have an average equivalent spherical diameter $D_{10}$ ranging from about 5-15 μm, an average equivalent spherical diameter $D_{50}$ ranging from about 17-27 μm and an average equivalent spherical diameter $D_{90}$ ranging from about 37-47 μm as measured by laser light scattering.

16. The method of claim 13, wherein the first viscosity of the metallic ink composition ranges from 150,000 to 200,000 mPa·s at 0.1 rad/s at 25° C.

17. The method of claim 13, wherein at least at least 90% of the ink image is transferred to the printable substrate.

18. The method of claim 13, wherein the printable substrate comprises a non-smooth surface.

19. The method of claim 13, wherein the printable substrate is selected from the group consisting of textured cardboard, textured plastic and uncoated paper.

20. The method of claim 13, wherein the metallic effect pigment particles comprise a substrate and an optically active coating, wherein the optically active coating is selected from the group consisting of metal oxides, metal oxide hydrates, metals, metal fluorides, metal nitrides, metal oxynitrides and mixtures thereof.

* * * * *